Dec. 25, 1956 R. MADEY 2,775,697
CRYSTAL DIODE COINCIDENCE CIRCUIT
Filed Aug. 27, 1953
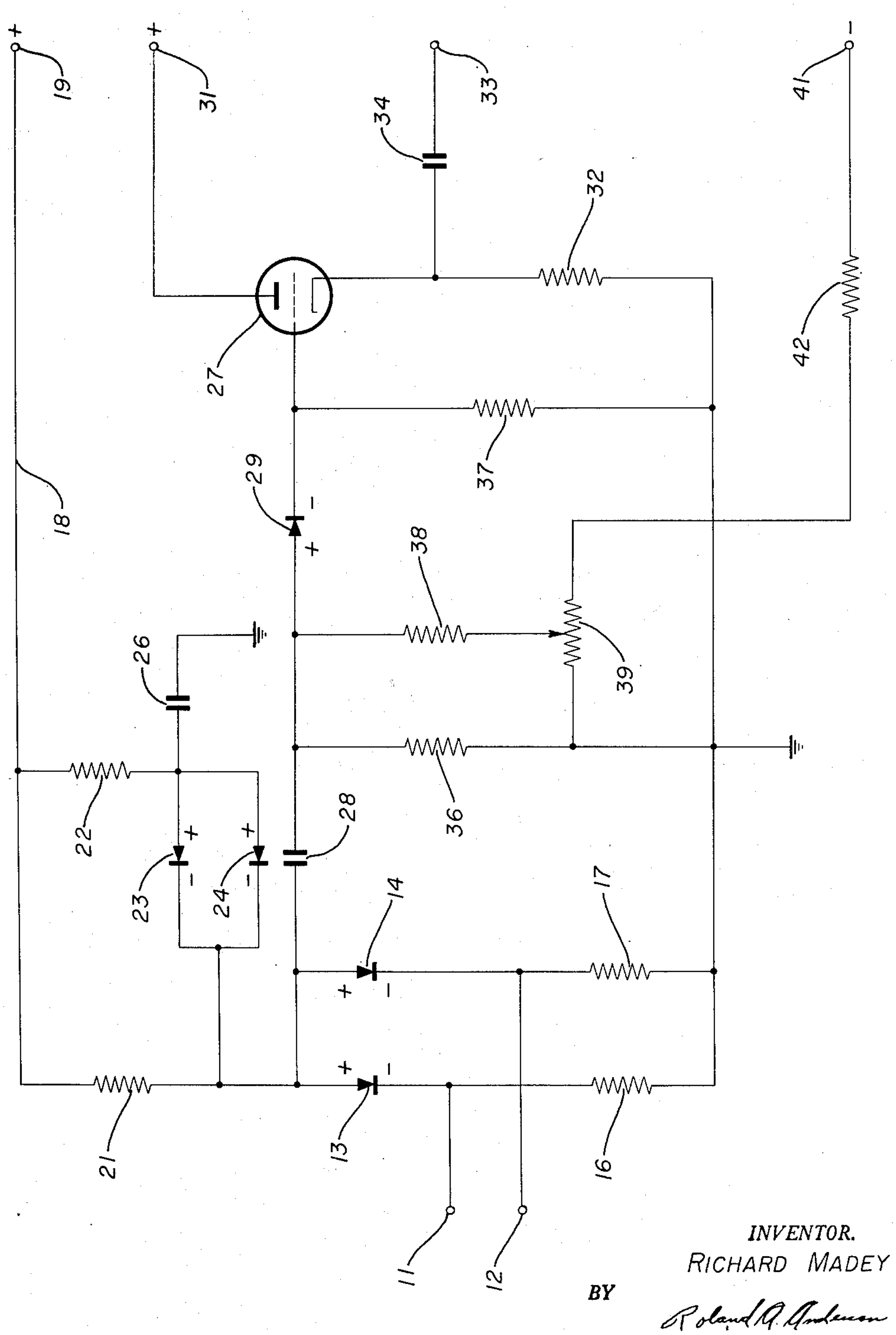
INVENTOR.
RICHARD MADEY
BY Roland A. Anderson
ATTORNEY.

United States Patent Office
2,775,697
Patented Dec. 25, 1956

2,775,697

CRYSTAL DIODE COINCIDENCE CIRCUIT

Richard Madey, Berkeley, Calif., assignor to the United States of America as represented by the United States Atomic Energy Commission Application August 27, 1953, Serial No. 382,499

3 Claims. (Cl. 250—27)

(Granted under Title 35, U. S. Code (1952), sec. 266)

The present invention relates to an improved coincidence circuit employing only crystal diode elements with the exception of a single output vacuum tube and thereby providing particular advantages over known coincidence circuits as set forth below.

Conventional coincidence circuits, of which there are many, normally operate to produce an output signal in response to two or more coincident input signals as an indication of the coincidence and the majority of these circuits are limited in the applicability to operation upon input signals of substantial duration due to the inherent limitations of the circuits themselves. There have been recently developed a number of high speed coincidence circuits adapted to cooperate with advanced detection equipment providing very high speed detection signals which are desired to be compared for coincidence. The present invention is an improvement over known high speed coincidence circuits and operates to produce an output signal in response to the coincident input of a number of very fast pulses, the resolving time of the present circuit being presently limited by the duration of input pulses to about $10^{-9}$ seconds. Additionally, the circuit of the present invention operates satisfactorily upon input pulses having lower voltage values than are required by other fast coincidence circuits and operates to produce better discrimination between coincidences and other phenomena producing similar electronic results.

It is the object of the present invention to provide an improved high speed coincidence circuit.

It is another object of the present invention to provide an improved coincidence circuit employing only crystal diode elements aside from an output vacuum tube.

It is a further object of the present invention to provide an improved coincidence circuit operable upon very low voltage input signals and including improved discriminating means for distinguishing minute variations between coincident input signals and other input signals.

Numerous other advantages and objects of the invention will become apparent to those skilled in the art from the following description of the single preferred embodiment of the invention taken together with the accompanying drawing wherein the sole figure is a circuit diagram of such embodiment.

Considering now the details of the illustrated embodiment of the invention, there are provided a pair of input terminals 11 and 12 which are connected to the negative sides of a pair of crystal diodes 13 and 14, respectively. These crystals 13 and 14 are individually grounded through like resistors 16 and 17, respectively, and the positive sides of the crystals are connected together so that same are therefore parallelly connected. Energization of the crystals 13 and 14 is provided by a positive voltage lead 18 connected to a terminal 19 which is, in turn, adapted for connection to the positive terminal of a power supply (not shown). Lead 18 is connected to the positive side of crystals 13 and 14 through a pair of parallel connected resistors 21 and 22 with resistor 22 having a pair of parallel connected crystal diodes 23 and 24 connected intermediate same and the positive sides of crystals 13 and 14. The crystals 23 and 24 are connected with their direction of maximum conductivity toward the crystals 13 and 14; i. e., the positive sides of the crystals 23 and 24 being connected to resistor 22. A capacitor 26 is connected between ground and the juncture of resistor 22 and crystals 23 and 24.

The foregoing circuit will be seen to provide a constant current flow through crystal diodes 13 and 14 between positive input terminal 19 and ground so that in the absence of input signals at input terminals 11 and 12 constant current flows through crystal diodes 13 and 14 in the direction of their maximum conductivity. During the absence of input pulses the ground capacitor 26 will thus be seen to become charged and it is preferable that resistor 22 have a lesser ohmic value than resistor 21 in order that a majority of the current to crystal diodes 13 and 14 will pass through resistor 22 and connected crystal diodes 23 and 24 to charge capacitor 26 substantially to the potential applied at input terminal 19.

The positive sides of crystal diodes 13 and 14 are also connected to the control electrode of a triode amplifier tube 27 through a coupling capacitor 28 and serially connected crystal diode 29. The anode of output tube 27 is connected to a terminal 31 which is, in turn, adapted for connection to a suitable plate supply and the cathode of the output tube is grounded through a load resistor 32. An output terminal 33 is connected through a capacitor 34 to the cathode of tube 27 so that variations in tube conductivity will produce a voltage difference across load resistor 32 which will, in turn, be reflected as an output signal at output terminal 33. The crystal diode 29 is directly connected to the control electrode of output tube 27 with the crystal being oriented with its direction of maximum conductivity toward the control electrode so that current may readily flow toward same. A resistor 36 is connected between ground and the juncture of coupling capacitor 28 and crystal diode 29, while a second resistor 37 is connected between ground and the juncture of crystal 29 and the control electrode of tube 27. Further connection is made from the positive side of crystal diode 29 through a resistor 38 to the movable contact of a potentiometer 39 that has one end thereof grounded and the other end thereof connected through a resistor 42 to a terminal 41 adapted to be energized by a source of negative potential (not shown).

The above-described circuit will be seen to include a circulating current which flows from ground through resistor 37, crystal diode 29, resistor 38, potentiometer 39, and resistor 42 to negative terminal 41. This current flows through crystal diode 29 in a direction opposite to the direction of maximum conductivity thereof so that the crystal diode 29 provides a very high resistance to such current flow. This circulating current further provides a voltage drop across resistor 37 which is connected between the cathode and control electrode of tube 27 and the polarity of this voltage is such that the control electrode of tube 27 is made negative with respect to the cathode and the cathode potential follows the potential of the control electrode.

Considering now the operation of the overall circuit described above and summarizing the static condition wherein no input pulses are applied to the input terminals 11 and 12, it is seen that a current flows from positive terminal 19 to ground through the parallel resistances 21 and 22 and parallel crystal diodes 23 and 24, and thence through crystal diodes 13 and 14 and their respective resistors 16 and 17. This current flows through diodes 13 and 14 and 23 and 24 in their respective directions of maximum conductivity so that these diodes present a very low resistance to such current flow. Furthermore, the voltage drop produced in resistors 16 and 17 by this current flow therethrough maintains the negative sides of crystal diodes 13 and 14 positive with respect to ground. The circulating current which flows between ground and the negative terminal 41 maintains output tube 27 in a very low conducting state and also establishes crystal diode 29 as a high resistance element for this particular current flow. By proper adjustment of potentiometer 39 the value of this latter circulating current may be varied so that the positive potential of the positive sides of crystal diodes 13 and 14 does not appear upon the control electrode of output tube 27. Thus in the static condition no output signal appears at output terminal 33.

Considering next the instance wherein simultaneous positive pulses are applied to input terminals 11 and 12, it will be seen that such pulses raise the potentials of the negative sides of crystal diodes 13 and 14 so that the current normally flowing therethrough is cut off. The potential of the positive sides of crystal diodes 13 and 14 thus materially increases in a positive direction and this potential pulse is transmitted through coupling capacitor 28 to crystal diode 29. The positive pulse resulting from nonconduction of crystal diodes 13 and 14 is sufficient to reverse the current flow through crystal diode 29 whereupon the resistance thereof immediately reduces to a very low value and substantially the entire pulse is thereupon applied to the control electrode of output tube 27 causing this tube to conduct more heavily. Current flow through output tube 27 produces a voltage drop across load resistor 32, which is thereby reflected as an output voltage pulse through capacitor 34 to the output terminal 33. The operation of parallel connected crystal diodes 23 and 24 together with grounded capacitor 26 is that of a voltage clamp well known in the art of coincidence circuits and described, for example, in the Review of Scientific Instruments, volume 21, No. 6, page 569.

The application of an input pulse to only one of the input terminals, as for example, terminal 11, raises the potential of the negative side of the associated crystal diode 13 so that same ceases to conduct; however, as crystal diodes have a very low resistance in their direction of maximum conductivity substantially the same circulating current flows between positive terminal 19 and ground as before with crystal diode 14 carrying an additional current almost equal to that normally carried by crystal diode 13. There is, however, produced by a single input pulse a small voltage variation at the positive sides of crystal diodes 13 and 14 and this small voltage pulse is coupled through capacitor 28 to crystal diode 29. With the proper setting of potentiometer 39 the circulating current between ground and negative terminal 41 through crystal diode 29 is made sufficient to maintaain current flow through crystal diode 29 in a direction opposite to the maximum conductivity thereof for all instances except a substantial voltage variation at the juncture of the positive sides of the crystal diodes 13 and 14, as is produced by coincident input pulses. Thus, although a single input pulse at one of the input terminals does produce a small pulse that is reflected upon the control electrode of tube 27, such pulse does not reverse the polarity through crystal diode 29 and, therefore, the resistance of same remains very high. Particularly advantageous discriminating action, in addition to that normally obtained with circuits of this type, is thereby produced. Commonly a single input pulse of long duration may produce the same electronic result in a coincidence circuit as a pair of simultaneous input pulses of short duration; however, in the present invention the time constant determining the charging time of the control electrode of output tube 27 is proportional to the product of the interelectrode capacitance of the tube and the resistance of crystal diode 29, so that as long as current flows through crystal 29 in a direction opposite to the direction of maximum conductivity thereof and maintains the crystal resistance high, a very long time constant results. However, in the instance where a sufficient pulse is applied to the crystal diode 29 to reverse the polarity of the current flow therethrough and the crystal resistance thereby decreases to a very small value, this time constant becomes extremely slow and the net effect of a pair of very fast coincident pulses is materially greater than that of a single pulse of long duration.

The foregoing description of operation embraces the commonly occurring types of inputs to the coincidence circuit and it will be seen therefrom that only simultaneous input pulses would produce at the circuit output terminal 33 a signal representative of such a coincidence. Any other than coincident input signals do not trigger the output tube of the circuit so that output signals are not produced thereby. As noted in the circuit description and explanation of operation, the present circuit is particularly advantageous in that it attains certain desirable characteristics not known in prior devices of this type. Thus the use of crystals in the input circuits allows smaller input pulses to be employed and further removes the necessity of providing additional amplification, as is commonly done in conventional circuits of this type. The improved discrimination of the present invention arising from the particular usage of crystal diode 29 provides further advantage over known coincidence circuits.

Although the present invention has been described with respect to a single preferred embodiment, it will be appreciated that numerous variations and modifications thereof are possible within the spirit and scope of the invention, and, for example, the invention may be readily employed as a triple or quadruple coincidence circuit requiring three or four simultaneous input signals to produce an output signal with a minimum of circuit modification. It is thus not intended to limit the present invention to the details illustrated and described but instead attention is directed to the following claims for a precise definition of the invention.

What is claimed is:

1. An improved coincidence circuit comprising a plurality of parallel-connected crystal diodes adapted for connection across a power supply whereby current flows therethrough in the direction of maximum conductivity thereof and each having a resistor serially connected thereto on the low voltage side thereof, a plurality of input terminals connected one to each of said crystals on the low voltage side thereof, an output tube having a control electrode and being joined to an output terminal for applying signals thereto, a coupling crystal diode connected to the control electrode of said output tube and capacitively coupled to said parallel-connected crystal diodes on the opposite sides thereof from said resistors with the direction of maximum conductivity toward said control electrode, and a circuit including said coupling crystal diode adapted for connection across a power supply for establishing a circulating current flow through said crystal diode oppositely of the direction of maximum conductivity thereof and including means for controlling the steady state amplitude of said circulating current for establishing the discriminating level of the coincidence circuit whereby only coincident input signals produce an output signal at said output terminal.

2. An improved crystal diode coincidence circuit comprising a plurality of crystal diodes having positive and negative sides with maximum conductivity in a direction from the former to the latter, a plurality of resistors connected one to each of said diodes at the negative side thereof, a crystal diode clamp and a resistor connected in parallel to the positive sides of said crystal diodes and adapted to connect same and associated resistors across a power supply for establishing a steady current flow therethrough in the direction of maximum conductivity of said diodes, a plurality of input terminals connected one to the negative side of each of said crystal diodes and adapted to receive positive input pulses which in coincidence cut off said diodes to produce a positive voltage pulse at the connected positive sides thereof, an output tube having a control electrode and a cathode resistor adapted for connection across a power supply, an output terminal connected to the cathode of said tube, a discriminating crystal diode connected between the positive sides of said crystal diodes and the control electrode of said output tube with the direction of maximum diode conductivity toward the latter, and a circuit including said discriminating crystal diode and a biasing resistor connected between the control electrode of said output tube and the cathode resistor, said circuit being adapted for connection across a power supply to cause a circulating current to flow in said circuit in a direction opposite to the direction of maximum conductivity of said discriminating crystal diode whereby the resistance thereof is large in the absence of pulse signals thereto from coincident input pulses which reverse the polarity of current flow through the crystal diode.

3. A crystal diode coincidence circuit comprising a plurality of parallel-connected crystal diodes with each having a resistor connected to the negative side thereof, power supply means connected across said diode-resistor combinations with the positive terminal thereof connected to the positive sides of said diodes for passing current therethrough in the direction of maximum conductivity thereof, a plurality of input terminals connected one to each of said diodes at the negative side thereof and adapted to receive positive voltage pulses, a normally conducting output tube having a control electrode, an output terminal connected in cathode-following relationship to said output tube, a coupling crystal diode capacitively coupled to the positive sides of the aforesaid crystal diodes and directly connected to the control electrode of said output tube, said coupling diode being disposed with the negative side thereof in connection with said output tube for providing a low impedance path for pulse signals thereto, and second power supply means connected across said coupling diode with the negative terminal thereof resistively coupled to the positive side of said diode for passing a predetermined current through said coupling diode oppositely of the direction of maximum conductivity thereof whereby only input signals to said coupling diode having an amplitude in excess of a predetermined minimum value reach said output tube and produce a signal at said output terminal.

References Cited in the file of this patent

UNITED STATES PATENTS 2,557,729 Eckert ---------------- June 19, 1951

OTHER REFERENCES

Review of Scientific Instruments, August 1953, vol. 24, No. 8, "A fast coincidence-anticoincidence analyzer," pp. 618–620.